Feb. 10, 1970 B. F. KALVELAGE 3,494,523

DEVICE FOR FRACTURING SCORED SHEETS OF BRITTLE MATERIAL

Filed Feb. 7, 1968 3 Sheets-Sheet 1

BERNARD F. KALVELAGE
INVENTOR

BY J. Rosenblum
ATTORNEY

BERNARD F. KALVELAGE
INVENTOR

BY J. Rosenblum
ATTORNEY

DEVICE FOR FRACTURING SCORED SHEETS OF BRITTLE MATERIAL

Filed Feb. 7, 1968 3 Sheets-Sheet 3

BERNARD F. KALVELAGE
INVENTOR

BY J. Rosenblum

ATTORNEY

United States Patent Office 3,494,523
Patented Feb. 10, 1970

3,494,523

DEVICE FOR FRACTURING SCORED SHEETS OF BRITTLE MATERIAL

Bernard F. Kalvelage, 7515 Tiptoe Lane, San Jose, Calif. 95129

Filed Feb. 7, 1968, Ser. No. 703,740
Int. Cl. B26f *3/00*; B65h *35/10*
U.S. Cl. 225—98 7 Claims

ABSTRACT OF THE DISCLOSURE

A device for fracturing scored sheets of brittle material in which a flexible endless belt is stretched about a plurality of pulleys. A fixed support bears against the belt, with a spring sheet extending from the support in the direction of the belt and bearing against a moveable pulley. The moveable pulley is moved against the spring sheet to flex the sheet into a desired curvature which forms a curved portion of the belt path adjacent the fixed support. Scored sheets of brittle material are inserted between the belt and the spring sheet and pass over the curved portion of the belt path where bending stress is applied to fracture the sheets along the score lines. Since the amount of bending stress so applied varies inversely with the radius of curvature of the flexed spring sheet, the applied fracturing stress applied to the scored sheets can be precisely preset and controlled by placement of the moveable pulley.

BACKGROUND OF THE INVENTION

The present invention relates to a device for fracturing brittle sheets which are scribed, or otherwise scored, along the desired lines of fracture. One example of such a scored sheet is a semiconductor wafer which has been scribed on one surface thereof into a grid-like pattern corresponding to small rectangular dice, which wafer is then fractured along the scribed lines so that the separate die are broken apart for use in transistors and other semiconductor devices.

In one device previously used for fracturing semiconductor wafers, described in U.S. Patent No. 3,182,873 of Bernard F. Kalvelage et al., the wafer is placed scribed side down on a flexible diaphragm, the diaphragm is stretched over a hemisphere, and air pressure is applied to stress the wafer in the direction of the hemisphere. This technique, although quite fast, has an undesirable low yield and also causes the contamination of certain types of wafers.

In another fracturing technique, the non-scribed side of the wafer is waxed to a flexible member such as thin plastic or paper, and then the wafer is flexed manually, with the scribed lines out over the edge of a sharp object. This technique has the advantage of high yield, but is undesirably time-consuming, permits no control of the induced stress, and also causes some contamination.

Another previously used technique consists of merely laying the wafer, scribed side down, on a flexible rubber member, placing a thin piece of plastic over the top, and manually pushing a roller over the wafer to cause fracturing. This technique also suffers from contamination and lack of control. In a variation of this technique, the scribed wafer is placed between thin sheets of plastic in order to minimize contamination, but this results in an undesirable consumption of time and, again, does not permit control of the induced stress.

The principal object of the present invention is to provide a novel fracturing device which is rapid in operation, and which permits the fracturing stress to be precisely preset and controlled for high fracturing yield without introducing contamination.

SUMMARY OF THE INVENTION

In accordance with the present invention, scored sheets are guided over a given path which includes a curved portion, the sheets are stressed as they pass over the curved path portion in order to apply a fracturing stress along the score lines of the sheet, and means are provided for precisely establishing the curvature of the curved path portion in order to precisely control the magnitude of the fracturing stress.

DESCRIPTION OF THE DRAWING

The various objects, features and advantages of the present invention will become more apparent upon a consideration of the following description, take in connection with the accompanying drawing, wherein:

Referring to FIGURE 1, an endless rubber belt 10 is stretched around a take-up idler pulley 11, a drive pulley 12, and a moveable idler pulley 13. As best seen in the enlarged fragmentary view of FIGURE 2, a fixed support member 14 is positioned against the belt 10 intermediate the pulleys 11 and 13, with a flexible sheet 15 fixedly clamped at one end thereof to the top of the support member 14. A slide or feeding plate 16 is fixedly positioned against the outside of the belt 10 between the pulley 11 and the support member 14.

Figures 1, 2:
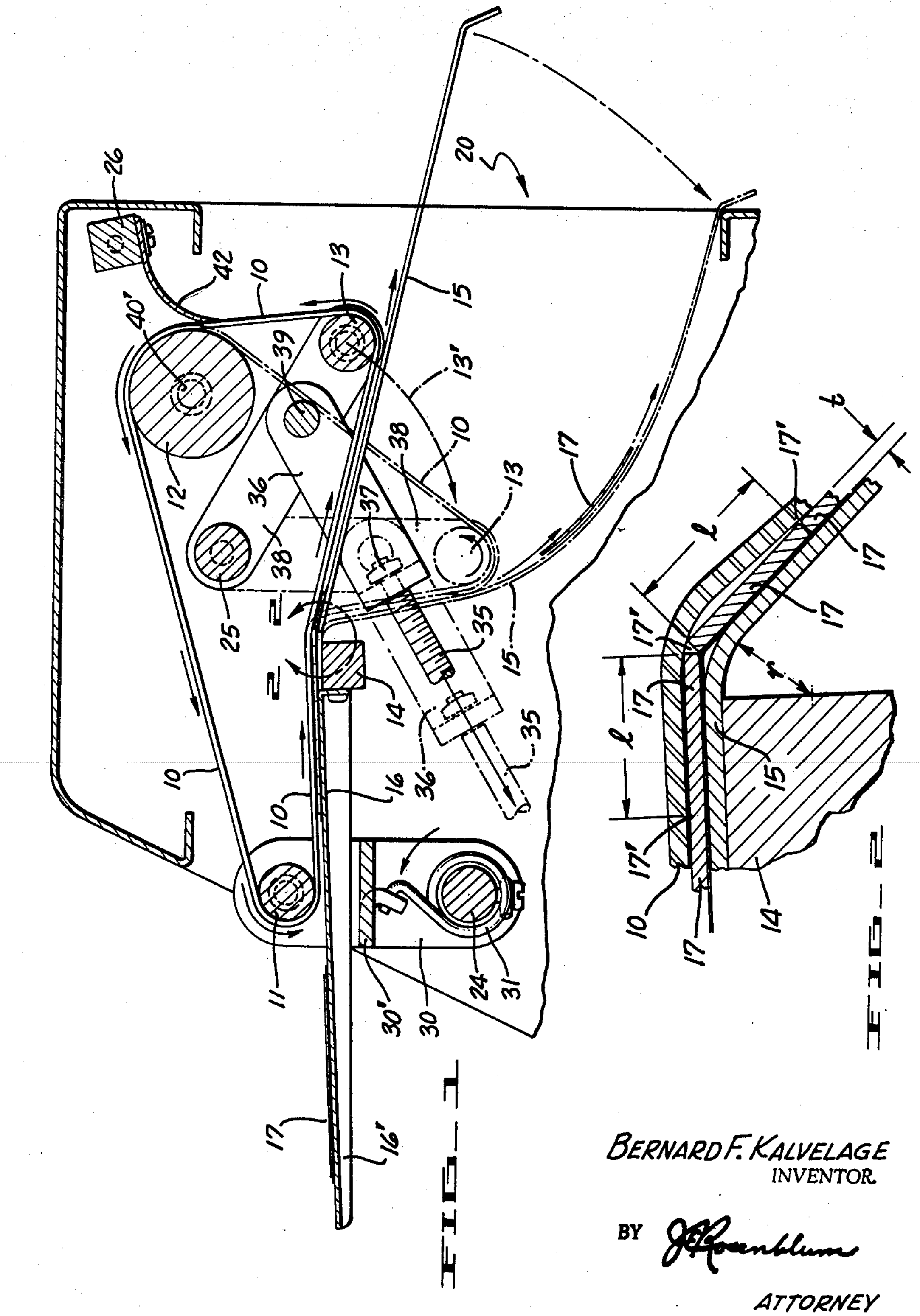
FIGURE 1 is a partially-diagrammatic, enlarged, fragmentary, elevational section view of a fracturing device in accordance with the present invention, utilized to illustrate the principles of operation.
FIGURE 2 is an enlarged view of a portion 2—2 in FIGURE 1.

Suitable means are provided for adjustably positioning the moveable pulley 13 along an arcuate path 13' from a position shown in solid line substantially aligned with the plate 16 to a position shown in broken lines substantially at right angles to said plate 16. The spring action of the sheet 15 resiliently urges said sheet against the pulley 13 so that as said pulley is moved along the arcuate path 13', said sheet 15 is adjustably positioned between a position shown in solid line substantially aligned with the plate 16 to a position shown in broken line substantially at right angles to said plate 16. The slide plate 16 may, for example, be a rigid steel plate coated on the upper surface thereof with a low friction coating such as, for example, Teflon, and the spring sheet 15 may be made from spring steel and also coated on its upper surface with a low friction coating such as, for example, Teflon.

In operation, a sheet 17 having scores 17' (FIGURE 2) scribed or otherwise marked into the top surface thereof is placed on an outwardly extending ledge 16' of the slide plate 16. The drive pulley 12 is actuated to rotate counter-clockwise, and the sheet 17 is inserted underneath the take-up pulley 11 between the belt 10 and the plate 16. The belt 10 then carries the sheet 17 over the fixed support 14 where it is fractured along the score lines 17' (FIGURE 2) and is then discharged underneath the pulley 13 from between the belt 10 and the spring sheet 15. In the case of a diced sheet, such as a semiconductor wafer, the sheet 17 is first run through the fracturing device with one set of parallel score lines 17' substantially perpendicular to the direction of movement of the belt 10 in order to fracture the sheet along said score lines. The sheet 17 is then rotated by substantially 90° and reinserted into the fracturing device in order to fracture the sheet along the set of score lines 17′ perpendicular to said first set of lines. Any suitable means may be provided for causing the dice to remain in position after fracturings. For example, the sheet 17 may be batch spray coated on the side reverse from the score lines 17′ with a quick, air-drying emulsion, or it may be waxed to a thin carrier sheet.

The belt 10, being stretched tightly over the pulleys 11, 12 and 13 tends to drive the scored sheet 17 past the fixed support 14 in a path closely following the curvature of the flexed spring sheet 15, as seen in FIGURE 2. As each die of length $l$ passes over the support 14 it is loaded by the belt 10 so that both the induced flexural stress and the induced vertical shear stress are maximized at the scribe lines 17′, thereby insuring a high yield of accurate fracturing along the score lines 17′. Such localization of induced stress also minimizes the requirement for precise alignment of the score lines 17′ relative to the belt 10, so that the sheet 17 may be rapidly inserted by an operator after a simple visual observation of the position of the score lines.

The amount of induced stress required to fracture a given die varies as a function of the parameter $(l/t)^2$, where $l$ is the length of the die and $t$ is the thickness of the die. This parameter may be referred to as the "index of fracturability." According to the present invention, the varying amounts of induced stress required for fracturing dice of varying indicies of fracturability are achieved by varying the radius of curvature of the belt-guiding member 15. In particular, the bending stress $S_b$ induced in the sheet 17 along score lines 17′ is given by:

$$S_b = \frac{Et}{r}$$

where E is the modulus of elasticity of the sheet 17. Thus as the pulley 13 is continuously moved from the solid line position to the broken line position, the radius $r$ of the belt-guiding spring sheet 15 continuously varies from a maximum value to a minimum value, thereby continuously varying the induced stress $S_b$ from a minimum value to a maximum value. It is worth noting that since the index of fracturability depends only on the ratio $l/t$, the same range of induced stress can be used for relatively thick and long die sizes as for relatively thin and short die sizes. Thus, for example, a fracturing device in accordance with the present invention may be used to fracture a thick film ceramic substrate of typical dimensions $t=25$ mils, $l=200$ mils as well as a thin semiconductor wafer of typical dimensions $t=7.5$ mils, $l=40$ mils.

Figures 3, 4:
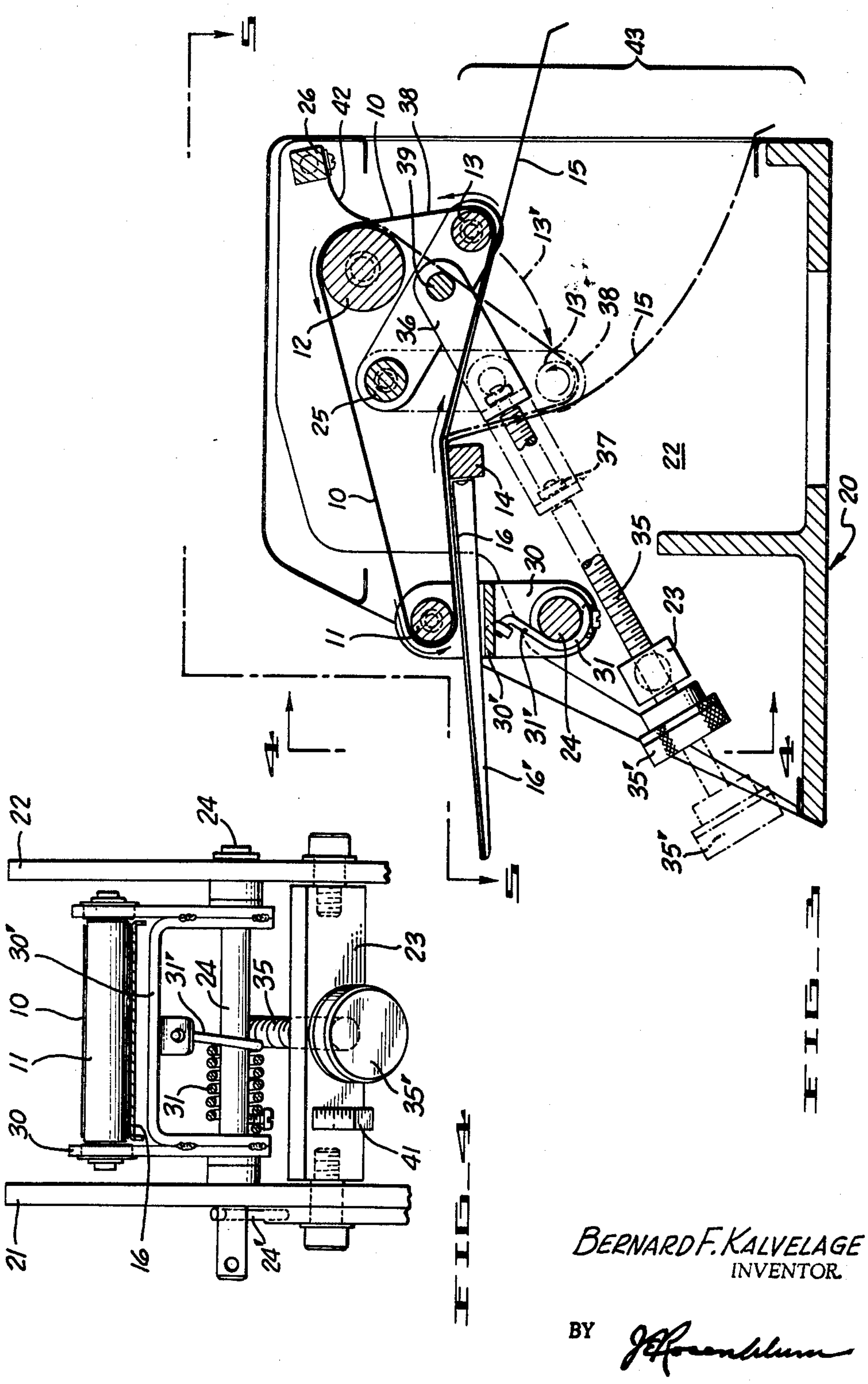
FIGURE 3 is an elevational section view with full constructional details, of a fracturing device in accordance with the present invention.
FIGURE 4 is a fragmentary view taken along line 4—4 in FIGURE 3.
Figure 5:
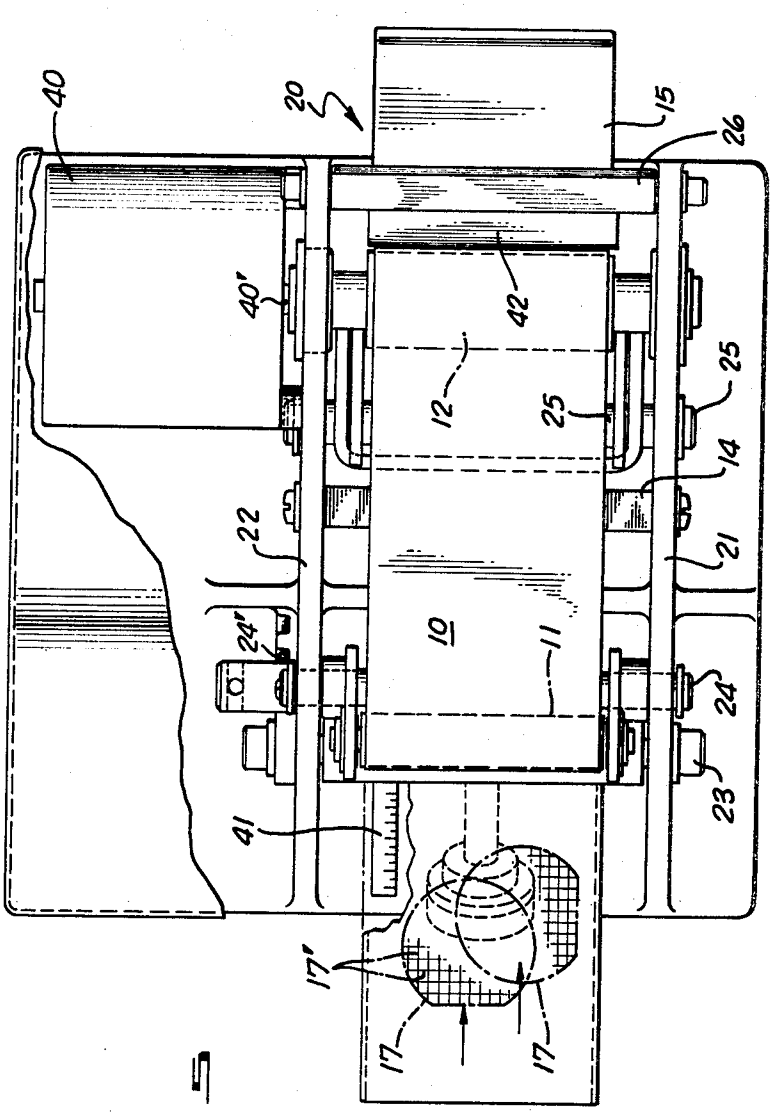
FIGURE 5 is a plan view, with cover broken away, taken along line 5—5 in FIGURE 3.

The constructional details of a fracturing device embodying the above-described elements is shown in FIGURES 3, 4, and 5. A frame 20 has two upstanding wall members 21 and 22 between which are mounted: an adjusting screw bar 23; a spring core 24; the fixed support member 14; and adjustable lever pivot pin 25; the drive pulley 12; and a wiper support 26. A suitable motor 40 is mounted to the outside of the frame wall 22 in order to drive the pulley 12 via a drive shaft 40′.

The take-up idler pulley 11 is supported at one end of a lever member 30. The other end of the lever member 30 is pivotedly mounted on the spring core 24. A coiled tension spring 31 is wound around, and fixed at one end, to the spring core 24 with the free end, 31′ of said spring engaging a bridge portion 30′ of the lever member 30 (FIGURE 4). The force of the spring 31 thus urges the take-up pulley 11 away from the pulleys 12 and 13 so as to stretch the belt 10 tight around said pulleys 11, 12 and 13. The spring core 24 is rotated until the desired force is exerted on the clevis bridge 30, and such core is then locked in position by a depending pin 24′ which fits into a cavity formed on the outside of the frame wall 21.

An adjusting screw 35 is threaded through bar 23 which is fixedly secured between the frame members 21 and 22. The screw 35 is captured against translation at the base of a clevis member 36 by means of a cap nut assembly 37. A lever member 38, carrying the moveable idler pulley 13 at one end thereof, is pivotedly attached by a pin 39 to the forked end of the clevis member 36. The other end of the lever member 38 is pivotedly attached to the pin 25 which is fixedly secured between the frame members 21 and 22.

By rotation of a knob 35′ at the end of the adjusting screw 35, the lever member 38 is pivoted about the pin 25 whereby the belt pulley 13 may be positioned along the arcuate path 13′ as previously described with reference to FIGURE 1. An index 41 is fixedly secured to, and projects from, the bar 23 in a direction substantially parallel to the adjusting screw 35. Thus the position of the screw knob 35′ is measured along the index 41 to give an indication of the bend radius $r$ of the spring sheet 15 as the pulley 13, controlling the flexure of said sheet, is moved in response to the rotation of the knob 35′. A flexible blade 42, attached to the support 26, is positioned so as to bear against the belt 10 and continuously wipe clean the surface of said belt in operation. The free end of the spring sheet 15 projects through an opening 43 in the rear of the frame 20 so as to provide a guide for discharging the scored sheet 17 after it has passed over the support member 14 and been fractured along the score lines 17′ (FIGURE 2). An auxiliary belt may be provided, if desired, for the purpose of carrying the fractured sheet 17 to a convenient stacking location.

The described fracturing device is fully automatic. In operation, 300–500 wafers or other sheets 17 may easily be fed through said device per hour.

Having thus described my invention, what I claim as new and desire to protect by Letters Patent is:

1. A device for fracturing scored sheets of brittle material, comprising: means for guiding said scored sheets over a given path, said path having a curved portion; means for applying a fracturing stress to said scored sheets as said sheets pass over said curved path portion; and means for selectively changing the radius of curvature of said curved path portion to thereby control the magnitude of said fracturing stress.

2. A device according to claim 1 including a bendable sheet, a flexible belt stretched over at least a portion of said bendable sheet, said belt being adapted to receive said scored sheets between said belt and said portion of said bendable sheet, said bendable sheet being formed into a curvature which defines the path of said scored sheets over said portion of said bendable sheets, and means for driving said belt whereby said belt moves said sheet over said path and applies a fracturing stress thereto determined by the shape of said curvature.

3. A device according to claim 2 wherein said bendable sheet is a spring sheet with one end thereof attached to a fixed support and the other end thereof extending freely from said fixed support, and further including means for flexing said spring sheet into a desired curvature for applying a desired fracturing stress to said scored sheet.

4. A device according to claim 3 wherein said belt is an endless belt stretched around a plurality of pulleys with said fixed support bearing against said belt and with said spring sheet extending from said fixed support in the direction of said belt and bearing against one of said pulleys, and including means for moving said pulley against said spring sheet whereby said spring sheet is flexed into said desired curvature and the portion of said belt adjacent said fixed support is guided along said curvature.

5. A device according to claim 4 wherein one of said pulleys is mounted to the free end of a lever member, the other end of said lever member being pivotedly mounted to a fixed member, and further including spring means applying a pivoting force to said lever member for maintaining said belt in a controllable stretched condition.

6. A device according to claim 4 wherein said moveable pulley is mounted to the free end of a lever member, the other end of said lever member being pivotedly mounted to a fixed member, and further including means for pivoting said lever member in order to move said pulley and establish said desired curvature.

7. A device according to claim 2 including means for selectively adjusting the tension of said flexible belt to insure said scored sheets follow a path closely following the curvature of said bendable sheet.

References Cited

UNITED STATES PATENTS

| | | | |
|---|---|---|---|
| 1,401,268 | 12/1921 | Manischewitz | 225—98 |
| 2,252,362 | 8/1941 | Carus | 225—98 |
| 2,555,916 | 6/1951 | Clark | 225—98 |
| 3,175,745 | 3/1965 | Insolio | 225—96.5 |

JAMES M. MEISNER, Primary Examiner

U.S. Cl. X.R.

225—96.5